United States Patent
Kwon et al.

(10) Patent No.: US 8,623,783 B2
(45) Date of Patent: Jan. 7, 2014

(54) ABSORBENT RESIN SURFACE-MODIFIED WITH CATIONIC POLYMER COMPOUND

(75) Inventors: Jong-Hyuk Kwon, Nam-gu Incheon (KR); Jun-Kyu Kim, Yuseong-gu Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/577,198

(22) PCT Filed: Feb. 8, 2011

(86) PCT No.: PCT/KR2011/000805
§ 371 (c)(1),
(2), (4) Date: Aug. 3, 2012

(87) PCT Pub. No.: WO2011/096777
PCT Pub. Date: Aug. 11, 2011

(65) Prior Publication Data
US 2012/0309619 A1   Dec. 6, 2012

(30) Foreign Application Priority Data
Feb. 8, 2010   (KR) .................. 10-2010-0011605

(51) Int. Cl.
*B01J 20/26*   (2006.01)
(52) U.S. Cl.
USPC ........................................... 502/402
(58) Field of Classification Search
USPC ........................................... 502/402
See application file for complete search history.

(56) References Cited

U.S. PATENT DOCUMENTS

| | | | |
|---|---|---|---|
| 3,959,569 A | 5/1976 | Burkholder, Jr. | |
| 4,824,901 A | 4/1989 | Alexander et al. | |
| 6,179,962 B1 * | 1/2001 | Brady et al. | 162/164.1 |
| 2004/0110006 A1 * | 6/2004 | Ishizaki et al. | 428/402 |
| 2005/0003191 A1 | 1/2005 | Ehrnsperger et al. | |

FOREIGN PATENT DOCUMENTS

KR   10-1999-0051876 A   7/1999

* cited by examiner

*Primary Examiner* — Colleen Dunn
*Assistant Examiner* — Haytham Soliman
(74) *Attorney, Agent, or Firm* — McKenna, Long & Aldridge, LLP.

(57) ABSTRACT

The present invention relates to an absorbent resin surface-modified with a cationic polymer compound. According to the present invention, the use of a cationic polymer compound can provide a simple and economical way to prepare an absorbent resin surface-modified with a cationic polymer compound with enhanced absorption rate and absorbency, overcoming the problem with the conventional absorbent resin having low absorption rate and poor absorbency. In accordance with one embodiment of the present invention, there is provided an absorbent resin comprising a cross-linked polymer which includes a base resin prepared in the form of powder by polymerizing a monomer based on acrylic acid having an acidic group and neutralized by 40 to 95 mol % and then forming an internal cross-linking with a first cross-linking agent, where the surface of the base resin is cross-linked with a second cross-linking agent, and the cross-linked polymer is surface-modified with a cationic polymer compound comprising a polyacrylamide-based polymer or its salt.

8 Claims, 1 Drawing Sheet

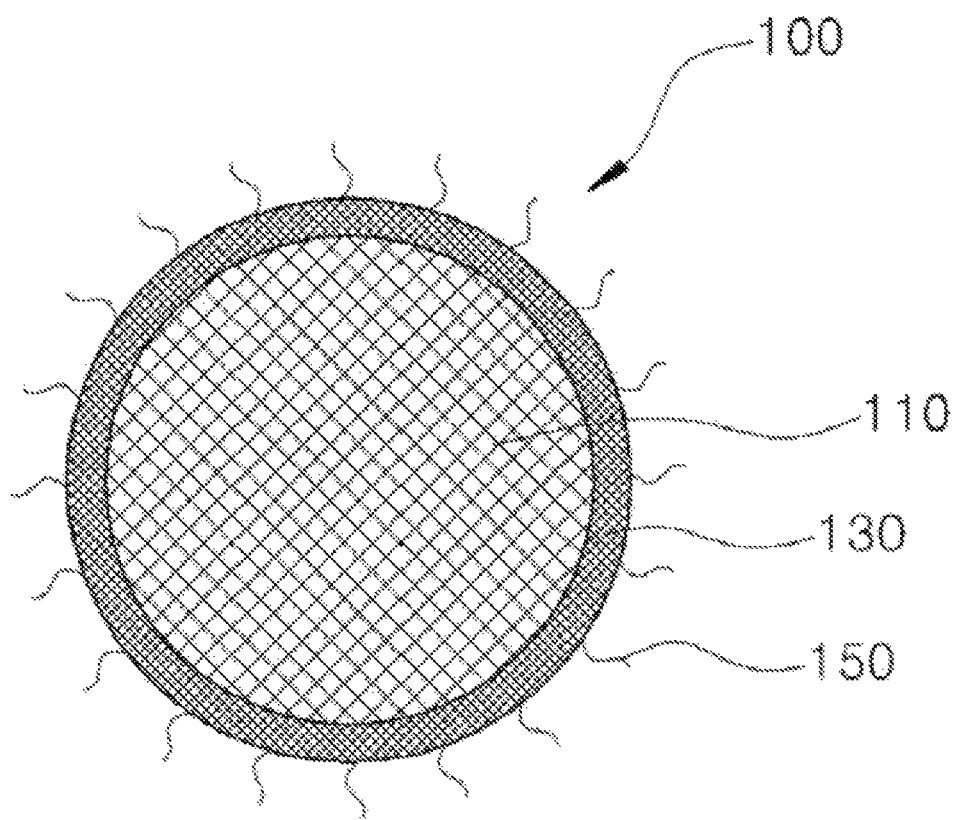

ABSORBENT RESIN SURFACE-MODIFIED WITH CATIONIC POLYMER COMPOUND

This application is a National Stage Entry of International Application No. PCT/KR2011/000805, filed Feb. 8, 2011, and claims the benefit of Korean Application No. 10-2010-0011605, filed on Feb. 8, 2010, which is hereby incorporated by reference in its entirety for all purposes as if fully set forth herein.

FIELD OF THE INVENTION

The present invention relates to an absorbent resin surface-modified with a cationic polymer compound that provides a simple and economical way to acquire high absorbency and high absorption rate by using a cationic polymer compound.

BACKGROUND OF THE INVENTION

The existing techniques to enhance the absorption rate of an absorbent resin mostly involve reducing the particle size of the resin, granulating the resin during preparation, or forming micro-pores inside or on the outer surface of the resin using a foaming agent, in order to increase the surface area of the absorbent resin.

More specifically, the methods of forming micro-pores in the absorbent resin include using a liquid carbonate to prepare a foamed resin; performing UV polymerization in the presence of a carbonate to provide porosity; or dispersing an inert gas into a viscous monomer mixture and polymerizing the monomer mixture alone or in combination with an organic solvent having a low boiling point. These methods, however, have some disadvantages, such as difficulty in forming uniform pores in the absorbent resin, with a limitation to enhance the absorption rate, or possible deterioration of the physical strength of the absorbent resin, leaving fine powder. The formation of fine powder causes a need for conducting an additional process of removing the fine powder. In worse cases, the fine powder remaining without being eliminated can be introduced into sanitary materials or other finished products to spoil the working environment with loose powder grains or cause a release of tiny powder grains out of the finished products.

On the other hand, there has been studied on a method for forming an ionic bond between an absorbent resin and an ionic compound in order to enhance the absorbency of the absorbent resin. But, this conventional method also faces a limitation in enhancing the absorbency of the absorbent resin.

Such problems with the conventional techniques have led to a consistent demand for a method more effective in enhancing the absorption rate of the absorbent resin as well as absorbency.

SUMMARY OF THE INVENTION

The present invention provides an absorbent resin and a preparation method for the same, which absorbent resin can be more enhanced in absorption rate and absorbency.

There is provided an absorbent resin comprising a cross-linked polymer which includes a base resin prepared in the form of powder by polymerizing a monomer based on acrylic acid having an acidic group and neutralized by 40 to 95 mol % and then forming an internal cross-linking with a first cross-linking agent. The surface of the base resin is cross-linked with a second cross-linking agent, and the cross-linked polymer is surface-modified with a cationic polymer compound comprising a polyacrylamide-based polymer or its salt.

The monomer based on acrylic acid is a compound represented by the formula 1:

 [Formula 1]

$R^2$—$COOM^1$

In the formula 1, $R^2$ is a hydrocarbon group having 2 to 5 carbon atoms and including an unsaturated bond; and $M^1$ is a hydrogen, a monovalent or divalent metal, an ammonium group, or an organic amine salt.

Here, the monomer based on acrylic acid is at least one selected from the group consisting of acrylic acid, methacrylic acid, and their monovalent metallic salt, divalent metallic salt, ammonium salt, or organic amine salt.

The first cross-linking agent is at least one selected from the group consisting of N,N'-methylene-bis-acrylamide, trimethylolpropane tri(meth)acrylate, ethylene glycol di(meth)acrylate, polyethylene glycol (meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, and ethylene carbonate. The second cross-linking agent is at least one from the group consisting of ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propane diol, dipropylene glycol, polypropylene glycol, glycerin, polyglycerin, butanediol, heptanediol, hexanediol, trimethylol propane, pentaerythritol, sorbitol, calcium hydroxide, magnesium hydroxide, aluminum hydroxide, iron hydroxide, calcium chloride, magnesium chloride, aluminum chloride, and iron chloride.

In the absorbent resin, the cationic polymer compound is contained in an amount of 0.01 to 10 parts by weight with respect to 100 parts by weight of the cross-linked polymer.

Further, the cationic polymer compound is at least one selected from the group consisting of polyacrylamide, polymethacryl amide, and their salts.

The cross-linked polymer is prepared by cross-linking the surface of the base resin in the presence of the second cross-linking agent at 90 to 250° C., and the absorbent resin has an average particle size of 150 to 850 μm.

Hereinafter, a detailed description will be given as to an absorbent resin surface-modified with a cationic polymer compound according to the preferred embodiments of the present invention with reference to the accompanying drawings. Throughout the description of the present invention, an identical or equivalent component is assigned the same reference numeral, and a redundant description regarding the component will be omitted.

While the terms including an ordinal number, such as "first", "second", etc., may be used herein to describe various components, such components are not limited to those terms. The terms are only to distinguish one component from another. For example, a first component may be named as a second component, and vice versa, without departing from the scope of the present invention. As used herein, the term "and/or" includes any and all combinations of one or more of the associated listed items.

When a component is referred to as being "formed" or "laminated" on another one, it can be directly formed or laminated on the whole or a part of the surface of another component, or a further another component may be provided between them.

In accordance with one embodiment of the present invention, there is provided an absorbent comprising a cross-linked polymer, which comprises a base resin prepared in the form of powder by polymerizing a monomer based on acrylic acid having an acidic group and neutralized by 40 to 95 mol % and then forming an internal cross-linking with a first cross-linking agent. The surface of the base resin is cross-linked with a second cross-linking agent, and the cross-linked polymer is surface-modified with a cationic polymer compound comprising a polyacrylamide-based polymer or its salt.

FIG. 1 is a schematic diagram showing the structure of an absorbent resin according to one embodiment of the present invention.

Referring to FIG. 1, the absorbent resin 100 according to one embodiment of the present invention is surface-modified with a cationic polymer compound and composed of a cross-linked polymer, which comprises a base resin in the form of powder prepared by polymerizing a monomer based on acrylic acid having an acidic group and being neutralized by 40 to 95 mol % and then forming an internal cross-linking with a first cross-linking agent. The base resin is surface-cross-linked with a second cross-linking agent, and the resultant resin particle surface-cross-linked is referred to as "cross-linked polymer".

Thus, the absorbent resin 100 includes an internally cross-linked base resin as a core 110 and a shell 130 internally cross-linked or surface-cross-linked, to constitute the cross-linked polymer.

The surface of the shell 130 of the cross-linked polymer can be modified by making an ionic bond with a defined cationic polymer compound, especially a polymer compound comprising a polyacrylamide-based polymer or its salt, so the polymer compound forms the outermost part 150 of the absorbent resin 100.

As demonstrated in the examples below, such an absorbent resin according to one embodiment of the present invention that is surface-modified with a specific cationic polymer compound can be further enhanced in absorbency and absorption rate and thus preferably used in a variety of sanitary materials, such as diapers, etc. The description below is given as to the absorption mechanism of the absorbent resin surface-modified with a cationic polymer compound and the technical principles that the absorbent resin has good absorbency and high absorption rate.

The absorption mechanism of the absorbent resin is controlled by the osmotic pressure pertaining to the difference of electrical attraction by the charges of a polymer electrolyte, the affinity between water and the polymer electrolyte, and the interaction between the molecular expansion caused by the repulsive force between ions of the polymer electrolyte and the suppression of the molecular expansion pertaining to the crosslinkage. More specifically, the absorbency of the absorbent resin depends on the above-mentioned affinity and the molecular expansion, while the absorption rate is dependent upon the osmotic pressure of the absorbent polymer.

The molecular expansion and the osmotic pressure of the absorbent polymer chain can be affected by the cross-linking density and distribution, the type or the surface characteristics of the cross-linking agent, and so forth. Thus, the absorbent resin according to one embodiment of the present invention uses first and second cross-linking agents to introduce internal and surface cross-linking structures, which makes the external cross-linking density of a particle of the absorbent resin higher than the internal cross-linking density. Accordingly, the cross-linking density and distribution can be optimized to control the molecular expansion and the osmotic pressure of the absorbent resin in a preferable range.

Further, the surface of the cross-linked polymer contained in the absorbent resin is modified with a specific cationic polymer compound to optimize the affinity for water and the osmotic pressure pertaining to the difference of electrical attraction.

Accordingly, the absorbent resin according to one embodiment of the present invention can have an enhanced absorption rate as well as high absorbency. In contrast to the absorbent resin of the present invention, an absorbent resin having a different cross-linking structure, or a different polymer compound, such as polyethylene imine, for surface modification of the cross-linked polymer may have deterioration of absorbency or absorption rate.

Hereinafter, a further detailed description will be given as to the individual components of the absorption resin according to one embodiment of the present invention with such excellent characteristics and a preparation method for the absorbent resin.

Monomer Based on Acrylic Acid

A monomer based on acrylic acid which is a compound of the following formula 1 can be used in the preparation of the absorbent resin surface-modified with a cationic polymer compound according to one embodiment of the present invention.

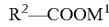
$R^2$—$COOM^1$  [Formula 1]

In the formula 1, $R^2$ is a hydrocarbon group having 2 to 5 carbon atoms and including an unsaturated bond; and $M^1$ is a hydrogen, a monovalent or divalent metal, an ammonium group, or an organic amine salt.

More preferably, the monomer based on acrylic acid is at least one selected from the group consisting of acrylic acid, methacrylic acid, and their monovalent metallic salt, divalent metallic salt, ammonium salt, or organic amine salt. Such a monomer based on acrylic acid can be used in the preparation of the absorbent resin having a core-shell-outermost part structure according to one embodiment of the present invention.

Before used, the monomer based on acrylic acid can be partly neutralized with an alkali substance, such as sodium hydroxide, potassium hydroxide, ammonium hydroxide, etc.

The monomer based on acrylic acid has a degree of neutralization in the range of about 40 to 95 mol %, preferably about 40 to 80 mol %, more preferably about 45 to 75 mol %. The range of the degree of neutralization is particularly dependent upon the final properties. An excessively high degree of neutralization can render most of the produced polymer soluble in water; whereas an excessively low degree of neutralization not only deteriorates the absorbency of the polymer but also endows the resin with hard-to-handle properties, such as of elastic rubber.

The monomer based on acrylic acid can be provided in the state of an aqueous solution prior to the polymerization step. The concentration of the monomer in such an aqueous solution is preferably about 40 to 95 mol %, more preferably about 45 to 85 mol %, which concentration range is for using the gel effect during the polymerization reaction in a high-concentration aqueous solution to eliminate a need for removing the unreacted monomer after the polymerization.

Water, as a solvent, is preferably used at a weight ratio of 1 to 5 with respect to the content of the monomer and can be determined in consideration of the heat of polymerization to control.

Initiator

For preparation of the absorbent resin, a polymerization initiator can be used to polymerize the monomer based on acrylic acid. The examples of the polymerization initiator include, but are not limited to, potassium persulfate, ammonium persulfate, sodium persulfate, or hydrogen peroxide, which can be used alone or in combination of at least two.

The concentration of the initiator is preferably 0.001 to 1.0 part by mole with respect to 100 parts by mole of the monomer. The initiator can be used in combination with a redox catalyst, which is preferably L-ascorbic acid.

Cross-Linking Agent

In preparation of the absorbent resin according to one embodiment of the present invention, the use of cross-linking agents is requisite to maintain the properties of the absorbent resin produced. The cross-linking methods for the absorbent resin include a simultaneous cross-linking method that is to introduce a crosslinkage between the chains of absorbent polymers simultaneously with polymerization, and an after-cross-linking method that involves a cross-linking with the functional group of the absorbent polymer after polymerization.

The use of a cross-linking agent having an appropriate chain length in order to reduce the drop of absorbency pertaining to an increase in the cross-linking density allows the preparation of an absorbent resin using an alkali metal salt of acrylic acid with good absorbency as well as high gel strength.

As for the first cross-linking agent, the cross-linking agent used to cause a simultaneous cross-linking can be α,β-unsaturated carboxylic acid monomer and any divinyl compound monomer capable of introducing a crosslinkage simultaneously with polymerization. The examples of the first cross-linking agent may include, but are not limited to, multifunctional cross-linking agents, such as N,N'-methylene-bis-acrylamide, trimethylolpropane tri(meth)acrylate, ethylene glycol di(meth)acrylate, polyethylene glycol (meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which can be used alone or in a mixture of at least two.

The second cross-linking agent can be any substance that reacts with the carboxyl group of a cross-linked polymer using an alkali metal salt of acrylic acid to form a surface-cross-linked structure. The examples of the second cross-linking agent may include, but are not limited to, glycidyl ethers or polyhydric alcohols, such as ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propane diol, dipropylene glycol, polypropylene glycol, glycerin, polyglycerin, butanediol, heptanediol, hexanediol, trimethylol propane, pentaerythritol, sorbitol, calcium hydroxide, magnesium hydroxide, aluminum hydroxide, iron hydroxide, calcium chloride, magnesium chloride, aluminum chloride, or iron chloride, which can be used alone or in a mixture of at least two.

The content of the first cross-linking agent is preferably 0.001 to 2.0 parts by weight with respect to 100 parts by weight of the monomer based on acrylic acid. The content of the first cross-linking agent less than 0.001 part by weight deteriorates the absorption rate and the gel strength of the final absorbent resin, whereas the content of the first cross-linking agent greater than 2.0 parts by weight reduces the absorbency of the absorbent resin, which is undesirable as an absorbent agent.

The content of the second cross-linking agent is preferably 0.001 to 2.0 parts by weight with respect to 100 parts by weight of the based resin. An excessively low content of the second cross-linking agent cannot introduce a surface-cross-linked structure, leading to poor absorbency or low absorption rate of the absorbent resin, whereas an excessively high content of the second cross-linking agent can reduce the absorbency of the absorbent resin unexpectedly.

The relative used amount of the first or second cross-linking agent depends on the chain length and the type of the cross-linking agent.

Temperature

As for the first cross-linking reaction using the first cross-linking agent, such as, for example, the internal cross-linking reaction, the reaction temperature may be about 20 to 120° C., preferably about 30 to 100° C. The polymerization reaction that occurs simultaneously with the cross-linking reaction is completed within 1 minute to 4 hours.

For the second cross-linking reaction using the second cross-linking agent, such as, for example, the surface cross-linking reaction, the reaction temperature may be about 90 to 250° C., preferably about 100 to 220° C. The reaction time may last 1 minute to 4 hours.

Cationic Polymer Compound

The final absorbent resin can be enhanced in absorption rate and absorbency by coating with a mixture of a substance capable of forming an ionic bond to the absorbent resin and a surface-cross-linked polymer. In other words, a (meth)acrylate-based absorbent resin which becomes anionic in contact with water or moisture can be enhanced in absorption rate and absorbency by addition of a substance capable of being ionized in contact with water or moisture to form an ionic bond to the absorbent resin.

In particular, the inventors of the present invention found it out from the results of an experiment that the use of a specific cationic polymer compound, including a polyacrylamide-based polymer or its salt, to modify the surface of the cross-linked polymer ended up with an absorbent resin having an enhanced absorption rate. Contrarily, the absorbent resin modified with a polymer compound of another type, such as polyethylene-based compound, possibly remains to be desired in regard to enhancement of absorption rate or absorbency.

The polyacrylamide-based polymer or its salt may be polyacrylamide-based polymer, polymethacrylamide-based polymer, or their metal-containing salts. The more specified examples of the polymer compound may include, but are not limited to, acrylamide aluminum sulfate, poly(meth)acrylamide, etc., which can be used alone or in a mixture of at least two.

The surface modification of a cross-linked polymer with such a cationic polymer compound involves dissolving the above-mentioned polymer compound in at least one or two solvents to prepare a cationic polymer compound solution, and then adding the solution to the surface-modified cross-linked polymer to cause a reaction, thereby obtaining the absorbent resin according to one embodiment of the present invention.

The cationic polymer compound may be used in an amount of about 0.01 to 10 parts by weight, preferably about 0.1 to 7 parts by weight with respect to 100 parts by weight of the cross-linked polymer. An excessively low content of the polymer compound cannot achieve sufficient enhancement in the absorption rate or absorbency of the absorbent resin, whereas an excessively high content of the polymer compound can deteriorate the absorbency of the absorbent resin unexpectedly.

The polymer compound may have a weight average molecular weight of about 2,000 to 1,000,000, preferably about 5,000 to 500,000, more preferably 10,000 to 500,000, and can be chosen appropriately for the surface modification of the absorbent resin The absorbent resin according to one embodiment of the present invention thus obtained can have an enhanced absorption rate as well as good absorbency by properly selecting the first and second cross-linking agents, introducing a cross-linked structure, and using a specific cationic polymer compound. Such an absorbent resin may have an average particle size of about 150 to 850 µm, preferably about 200 to 750 µm, which can be acquired by conducting an additional process of grinding and/or size-sorting before or after the surface cross-linking process.

As described above, the present invention uses a specific cationic polymer compound to overcome the problems with the conventional absorbent resins having low absorbency and low absorption rate and thus provides an absorbent resin surface-modified with a cationic polymer compound with high absorbency and high absorption rate.

Further, the surface modification with a cationic polymer compound can provide a simple and economical way to enhance the absorbency and absorption rate of an absorbent resin.

BRIEF DESCRIPTION OF THE DRAWINGS

FIG. 1 is a schematic diagram showing the structure of an absorbent resin surface-modified with a cationic polymer compound according to one embodiment of the present invention.

DETAILED DESCRIPTION OF THE INVENTION

Hereinafter, the functions and the effects of the present invention will be described by way of the specific examples of the present invention, which are only to exemplify the present invention and not intended to limit the scope of the present invention.

EXAMPLE 1

To 500 g of acrylic acid was added 1.0 g of N,N'-methylene-bis-acrylamide as an internal cross-linking agent (i.e., a first cross-linking agent) and then 971.4 g of an aqueous solution of 20% sodium hydroxide, to prepare an aqueous solution of water-soluble unsaturated monomer (degree of neutralization of a monomer based on acrylic acid: 70 mol %).

The aqueous solution of water-soluble unsaturated monomer was fed into a 5 L twin-armed kneader equipped with a sigma-type axis, maintained at 40° C. and purged with nitrogen gas for 30 minutes to eliminate oxygen which was dissolved in the aqueous solution. While stirred, to the aqueous solution were added 50.1 g of 0.2 wt % L-ascorbic acid, 50.5 g of an aqueous solution of sodium persulfate, and 51.0 g of an aqueous solution of 2.0 wt % hydrogen peroxide. The polymerization reaction was initiated in 20 minutes, and the gel produced was finely divided by way of shear force for 30 minutes.

The gel finely divided was spread as thick as about 30 mm on a stainless wire gauze having a hole size of 600 µm and dried out in a hot air oven at 140° C. for 5 hours. The dry polymer thus obtained was ground with a grinder and then size-sorted through an ASTM standard sieve to obtain a base resin, which was an absorbent resin powder 1 having a particle size of 150 to 850 µm.

The base resin (100 g) was uniformly blended with a mixture containing 0.3 g of ethylene glycol diglycidyl ether (i.e., a second cross-linking agent: a surface cross-linking agent), 3.0 g of methanol, and 3.0 g of water and then dried out in a hot air oven at 140° C. for 30 minutes. The dry powder thus obtained was size-sorted through an ASTM standard sieve to obtain a cross-linked polymer, which was an absorbent resin powder 2 having a particle size of 150 to 850 µm.

To the cross-linked polymer (100 g) thus obtained was added 1.0 g of a 50% aqueous solution of polyacrylamide (Mw: about 3,000) as a cationic polymer compound to prepare an absorbent resin of Example 1.

EXAMPLE 2

The procedures were conducted in the same manner as described in Example 1, excepting that the used amount of the 50% aqueous solution of polyacrylamide was 3.0 g rather than 1.0 g to prepare an absorbent resin of Example 2.

EXAMPLE 3

The procedures were conducted in the same manner as described in Example 1, excepting that the used amount of the 50% aqueous solution of polyacrylamide was 10.0 g rather than 1.0 g to prepare an absorbent resin of Example 3.

EXAMPLE 4

The procedures were conducted in the same manner as described in Example 1, excepting that 1.0 g of a 50% aqueous solution of poly(meth)acrylamide (Mw: about 3,000) was used instead of the 50% aqueous solution of polyacrylamide to prepare an absorbent resin of Example 4.

EXAMPLE 5

The procedures were conducted in the same manner as described in Example 1, excepting that the used amount of the 50% aqueous solution of poly(meth)acrylamide was 10.0 g rather than 1.0 g to prepare an absorbent resin of Example 5.

COMPARATIVE EXAMPLE 1

The procedures were conducted in the same manner as described in Example 1, excepting that the polyacrylamide was not used to prepare an absorbent resin of Comparative Example 1.

COMPARATIVE EXAMPLE 2

The procedures were conducted in the same manner as described in Example 1, excepting that 1.0 g of a 50% aqueous solution of polyethylene imine (Mw: 25,000) was used as a polymer compound instead of the aqueous solution of polyacrylamide to prepare an absorbent resin of Comparative Example 2.

The absorbent resin powders prepared in the Examples and the Comparative Examples were measured in regard to absorbency, fluid retention capacity, and absorption rate as follows.

[Absorbency]

1.0 g of each absorbent resin was put in a 250 mL beaker and mixed with about 150 g of saline solution to absorb the saline solution for 30 minutes. In 30 minutes, the gel thus formed was poured onto a standard sieve (#100 mesh, 90 mm in diameter) and kept for 30 minutes to eliminate the unabsorbed portion of the saline solution. The absorbed portion of the saline solution was then weighed, and the weight was defined as absorbency.

[Fluid Retention Capacity]

The fluid retention capacity of each absorbent resin was measured according to the WSP 241.2(05) as recommended by EDANA (European Disposals And Nonwovens Association).

[Absorption Rate]

50 g of saline solution and a Teflon-coated octagonal magnetic stir bar (8 mm×30 mm) were put into a 100 mL glass beaker and stirred at 600 rpm on a magnetic stirrer. Once a vortex was created stably, 20 g of each absorbent resin was added at once. Then, the time taken from the disappearance of the vortex until the saline solution had a smooth surface was measured and defined as "absorption rate".

The measurement results in regard to absorbency, fluid retention capacity, and absorption rate are presented in Table 1.

TABLE 1

| | Absorbency (g/g) | Fluid Retention Capacity (g/g) | Absorption Rate (sec) |
|---|---|---|---|
| Example 1 | 61 | 34 | 50 |
| Example 2 | 61 | 33 | 45 |
| Example 3 | 59 | 31 | 45 |
| Example 4 | 60 | 31 | 50 |
| Example 5 | 60 | 32 | 50 |
| Comparative Example 1 | 61 | 31 | 70 |
| Comparative Example 2 | 58 | 30 | 65 |

Referring to Table 1, the absorbent resins of the Examples 1, 2 and 3 which were surface-modified with a specific cationic polymer compound had a much enhanced absorption rate as well as equivalent absorbency or greater, when compared with the absorbent resins of the Comparative Examples 1 and 2 which used none of the cationic polymer compound or a polymer compound of another type.

What is claimed is:

1. An absorbent resin surface-modified with a cationic polymer compound, comprising a cross-linked polymer,
the cross-linked polymer comprising a base resin prepared in the form of powder by polymerizing a monomer based on acrylic acid having an acidic group and neutralized by 40 to 95 mol % and then forming an internal cross-linking with a first cross-linking agent, the base resin having a surface thereof being cross-linked with a second cross-linking agent,
the cross-linked polymer being surface-modified with a cationic polymer compound comprising a polyacrylamide-based polymer or a salt thereof, which is at least one selected from the group consisting of polyacrylamide, polymethacryl amide, and salts thereof.

2. The absorbent resin as claimed in claim 1, wherein the monomer based on acrylic acid is a compound represented by the formula 1:

$$R^2\text{—COOM}^1 \qquad \text{[Formula 1]}$$

wherein $R^2$ is a hydrocarbon group having 2 to 5 carbon atoms and including an unsaturated bond; and $M^1$ is a hydrogen, a monovalent or divalent metal, an ammonium group, or an organic amine salt.

3. The absorbent resin as claimed in claim 1, wherein the monomer based on acrylic acid is at least one selected from the group consisting of acrylic acid, methacrylic acid, and monovalent metallic salt, divalent metallic salt, ammonium salt, or organic amine salt thereof.

4. The absorbent resin as claimed in claim 1, wherein the first cross-linking agent is at least one selected from the group consisting of N,N'-methylene-bis-acrylamide, trimethylolpropane tri(meth)acrylate, ethylene glycol di(meth)acrylate, polyethylene glycol (meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, and ethylene carbonate.

5. The absorbent resin as claimed in claim 1, wherein the second cross-linking agent is at least one from the group consisting of ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propane diol, dipropylene glycol, polypropylene glycol, glycerin, polyglycerin, butanediol, heptanediol, hexanediol, trimethylol propane, pentaerythritol, sorbitol, calcium hydroxide, magnesium hydroxide, aluminum hydroxide, iron hydroxide, calcium chloride, magnesium chloride, aluminum chloride, and iron chloride.

6. The absorbent resin as claimed in claim 1, wherein the cationic polymer compound is contained in an amount of 0.01 to 10 parts by weight with respect to 100 parts by weight of the cross-linked polymer.

7. The absorbent resin as claimed in claim 1, wherein the cross-linked polymer is prepared by cross-linking the surface of the base resin in the presence of the second cross-linking agent at 90 to 250° C.

8. The absorbent resin as claimed in claim 1, wherein the absorbent resin has an average particle size of 150 to 850 μm.

* * * * *